May 13, 1930.  K. O. SCHAUMAN  1,758,854
VEHICLE CONTROL MEANS
Original Filed April 16, 1926  3 Sheets-Sheet 1
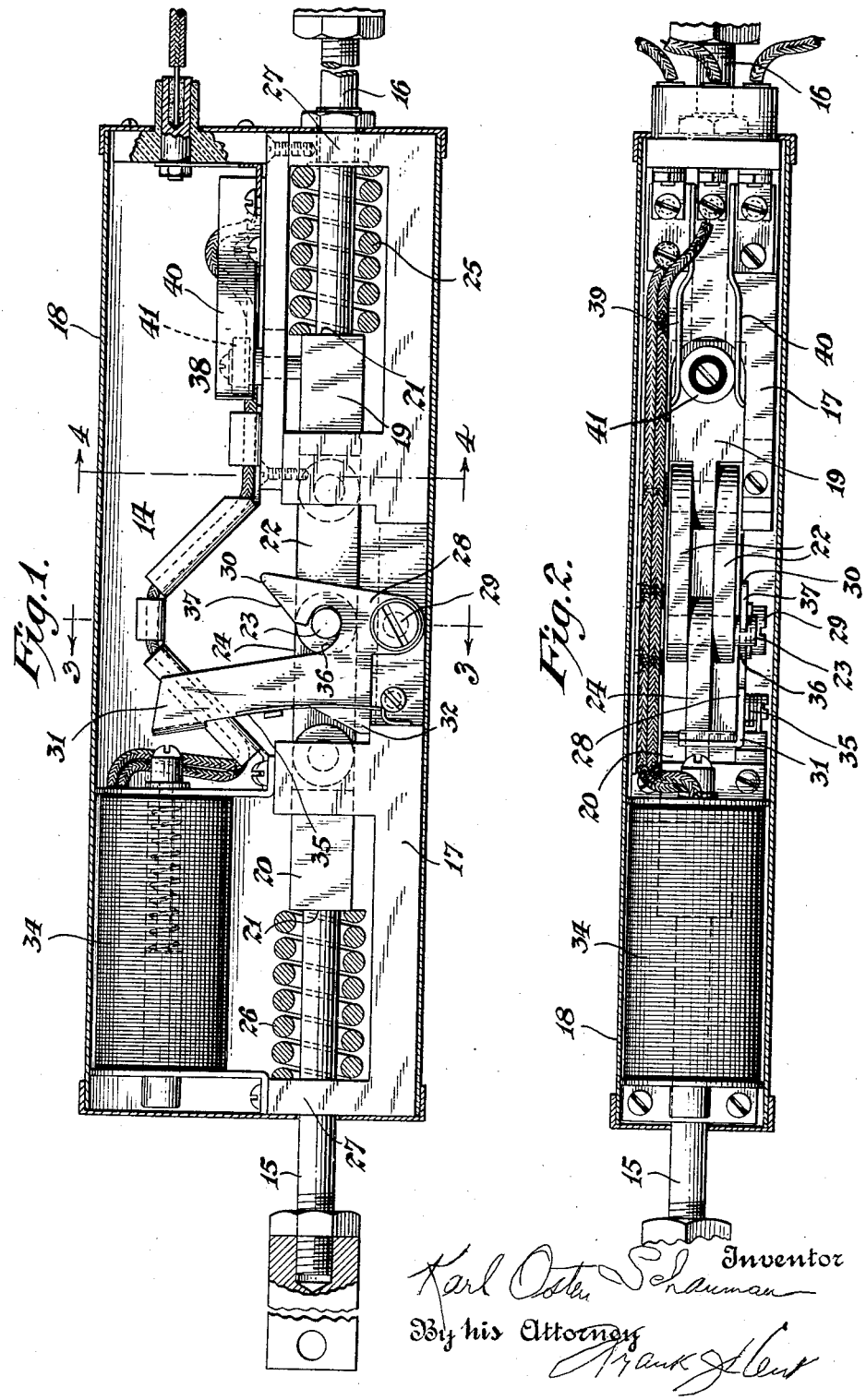

May 13, 1930. K. O. SCHAUMAN 1,758,854
VEHICLE CONTROL MEANS
Original Filed April 16, 1926  3 Sheets-Sheet 2
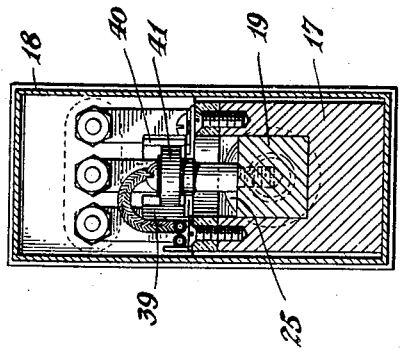
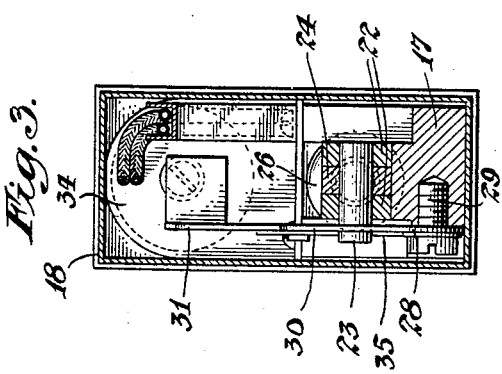
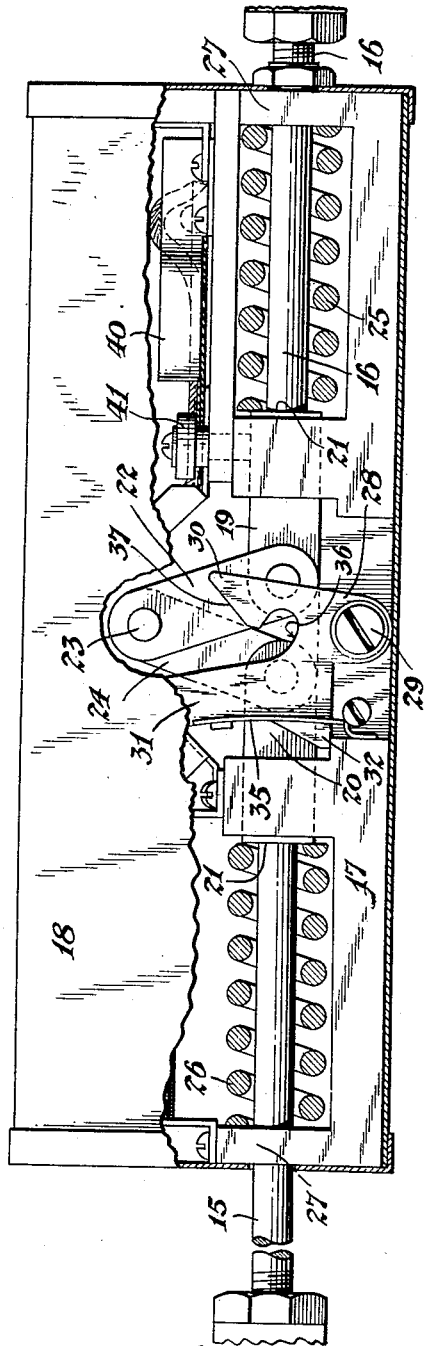
Inventor
Karl Osten Schauman
By his Attorney

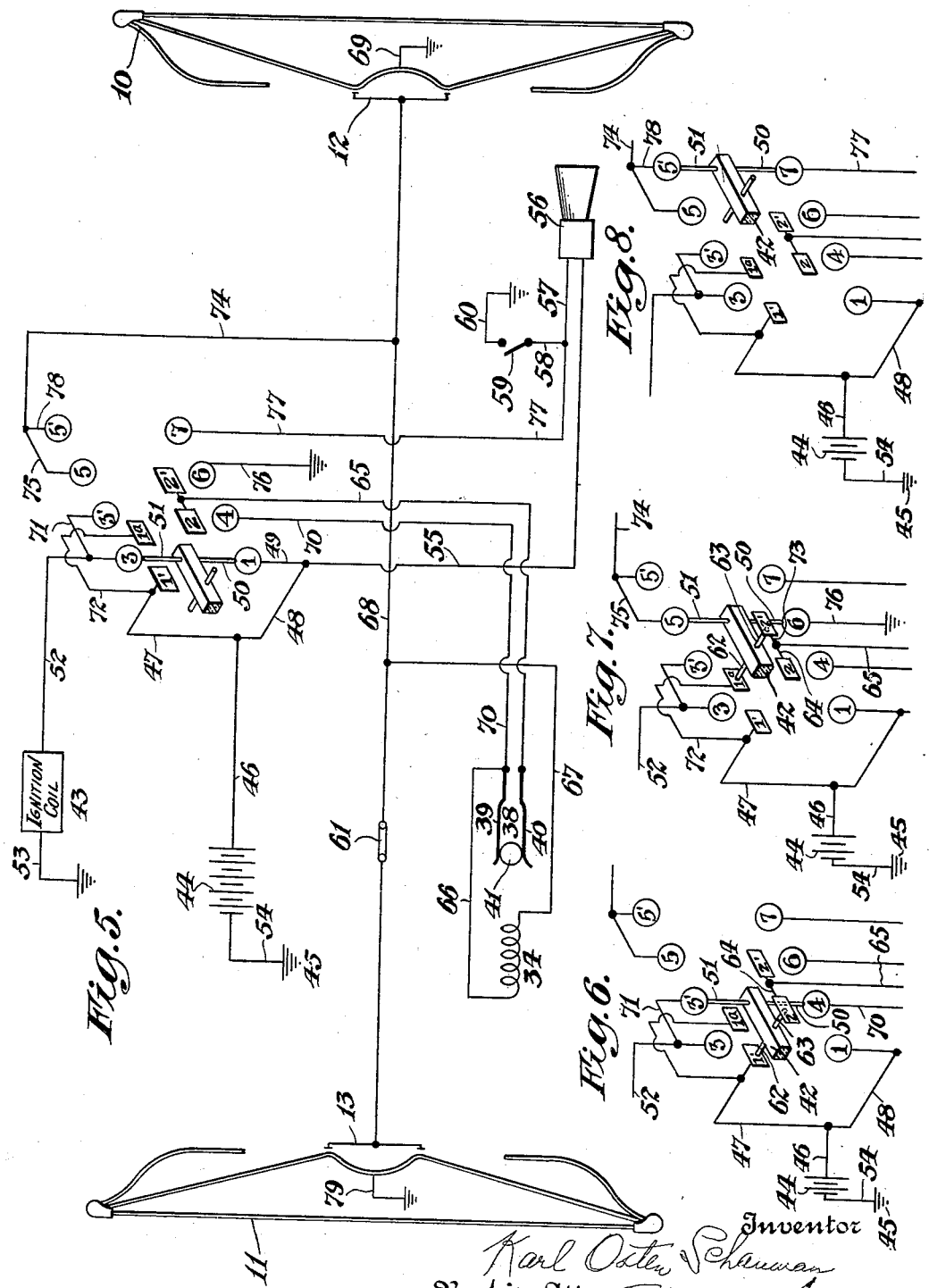

Patented May 13, 1930

1,758,854

UNITED STATES PATENT OFFICE

KARL OSTEN SCHAUMAN, OF NEW YORK, N. Y., ASSIGNOR TO WILLIAM HENRY AVERY, OF SAN FRANCISCO, CALIFORNIA

VEHICLE CONTROL MEANS

Application filed April 16, 1926, Serial No. 102,402. Renewed January 17, 1929.

This invention relates generally to means for automatically stopping automobile vehicles under emergency conditions.

The invention includes electrically controlled means for simultaneously actuating the emergency brakes and interrupting the ignition circuit of the engine. The electrical controlling means is in turn under the direct control of the operator for bringing about an emergency stopping of the vehicle more quickly than can be accomplished by the brake operating means usually available. The electrical controlling means is also responsive to circuit controlling devices actuated by the vehicle bumpers in order to bring about an automatic actuation of the brakes independently of the control exercised by the operator.

The brake actuating means in its preferred form is mounted in and normally forms a section of the brake actuating rod ordinarily forming an operating connection between the emergency brakes and a hand lever available to the operator.

The brake actuating means includes springs tending to pull the ends of sections of the brake rod toward each other upon the tripping of mechanism interposed between these sections of the brake rod to thereby reduce the length of the rod and in consequence thereof apply the brakes to the vehicle. The tripping mechanism includes a mechanical latch which normally restrains the springs from operation and the latch is arranged to be released as the result of the energization of a solenoid forming part of the mechanism referred to.

Other features of the invention include means for breaking the ignition circuit when the electrical controlling means functions. Another feature is the provision of means for automatically sounding an alarm if either bumper of a parked car is engaged by another vehicle.

In the drawings:

Fig. 1 is a side elevation of my improved brake actuating mechanism with the casing thereof in section;

Fig. 2 is a plan view of Fig. 1 with the casing in section;

Fig. 3 is a transverse section on the line 3—3 of Fig. 1;

Fig. 4 is a similar view on the line 4—4 of Fig. 1;

Fig. 5 is a diagrammatic view of the electrical circuits used in the construction;

Figs. 6, 7 and 8 are diagrams showing the switch in different operative positions;

Fig. 9 is a view similar to Fig. 1 but with the parts in another position.

Referring to the drawings for a more detailed description of the invention, at 10 is shown the forward bumper and at 11 the rear bumper of an automobile equipped with the electrically controlled means for carrying out the invention. The bumpers 10 and 11 are indicated diagrammatically and are of a type arranged to engage electrical contact members 12 and 13 to form circuit connections to bring about actuation of the vehicle stopping devices as will be hereinafter described.

An important feature of the invention resides in the provision of electrically controlled vehicle stopping mechanism 14 which is mounted in an interrupted portion of the emergency brake rod and normally forms a part of the brake rod connection between the emergency brakes and the hand operating lever therefor, the two latter not being shown in the drawings. By this construction the brake rod is divided into two sections 15 and 16, the former leading to the brake and the latter to the hand lever for suitable operation in a well known manner.

Sections 15 and 16 are supported and guided in a frame 17 enclosed in a protective casing 18. Secured to the sections 15 and 16 at their opposed ends, or forming an integral part thereof, are heads 19 and 20 having shoulders 21. To head 19 is pivoted a pair of links 22 which in turn are pivoted at 23 to one end of a link 24, the other end of which is pivoted to the head 20. Springs 25 and 26, sufficiently powerful to actuate the brake mechanism, bear at one end against the shoulders 21 and at their opposite ends against abutment members 27 forming a part of the frame 17.

In the normal position of the parts of the brake actuating mechanism as shown in Fig.

1, the spring members 25 and 26 are retained in a compressed condition because of the alignment of the links 22 and 24 with the sections 15 and 16 of the brake rod, together with the cooperation of a latch member 28 maintaining such alignment.

The latch member 28 is pivoted at 29 to the frame 17 at a point directly below the pivot 23 and also functions to press upwardly against the pivot 23 to break open the buggy joint in the links at this point.

The latch 28 is further provided with a hook member 30 adapted to extend over the pivot 23 and maintain the aforesaid alignment by preventing the upward movement of the pivot 23 during the normal operation of applying the brakes. The latch is also provided with an upwardly extending member 31 having a projection 32 which engages the frame 17 to provide a stop, a spring 35 serving to effect such engagement. Member 31 is adapted to be engaged by the core of a solenoid 34 when the latter is energized by the closing of an electric circuit controlling its operation. A cam surface 36 on the latch member is arranged to engage the pivot 23 when the solenoid is active and the latch member is moved thereby about its pivot 29, whereupon the links will assume the position shown in Fig. 9 due to the co-operating urge of the springs 25 and 26. Thus the distance between the opposed ends of the sections 15 and 16 will be lessened effecting a shortening of the brake rod and hence applying the brakes to the vehicle. It will be understood that since the section 16 is held in a fixed position due to its connection with the hand lever, the latter being always locked by the usual pawl associated therewith, the frame 17 together with the casing must of necessity partake of a longitudinal movement in order to make the spring 25 effective. In other words, when the parts assume the position shown in Fig. 9 the section 15 will be drawn into the casing and the latter will slide along the fixed section 16.

The parts may be reset following an operation, by a movement of the hand lever to pull the sections 15 and 16 apart again followed by the straightening out of the links 22 and 24 and the recharging of the springs 25 and 26. During this movement the pivot 23 will contact with a sloping surface 37 on the hook member 30 and the latch member will be rocked on its pivot 29 to permit the hook to assume the position shown in Figure 1 under the influence of the spring 35, the projection 32 limiting the extent of such movement whereupon the brake actuating mechanism will again be ready for automatic or normal hand operation, provided however that the brakes are first released again as this resetting of the mechanism corresponds substantially to a normal manual application of the brakes.

The vehicle stopping mechanism 14 is provided with a cut-out switch 38 controlling the ignition circuit of the engine so that when an automatic application of the brakes occurs the ignition circuit will be simultaneously broken so that the retarding influence of the engine compression will be added to that of the brakes. The switch 38 consists of two spring arms 39 and 40 and bridge contact 41 adapted to bridge said arms and close a circuit passing through the arms.

The bridge contact 41 is supported on the head 19 of the section 16 and is suitably insulated therefrom, and the arms 39 and 40 are mounted on the frame 17, hence relative movement between the frame and section 16 will cause the contact 41 to move away from arms 39 and 40 to the position shown in Fig. 9, thereby breaking the ignition circuit normally flowing through said arms.

The circuits feeding the automatic protective system as well as the horn and ignition circuits are controlled by a reciprocating manual switch member 42 which carries arms 50, 51, 62 and 63 adapted to make contact between pairs of opposite contacts. This switch member has at least four operative positions as follows:

1. Inactive position, shown in Fig. 5. This position of the switch sends current through the ignition circuit and through the horn button circuit but renders the automatic bumper control circuits inactive, and is used whenever it is desired to run the car without the automatic bumper control.

2. Protective position, shown in Fig. 6. With the switch in this position the car is in the same condition as when the switch is in position, except that current is now going into the bumper control circuits, and the automatic control will be operated upon the bumper contact being closed.

3. Emergency position, shown in Fig. 7. Whenever the driver wishes to make an emergency stop he pushes the switch to this position, thereby causing an electrical application of the emergency brakes and breaking the ignition circuit.

4. Parking position, shown in Fig. 8. When the switch is in this position current is going through a circuit including the horn and the bumper contacts, so that the horn will sound if an object engages with either bumper.

The circuit connections corresponding to the different positions of the switch will now be set forth. The usual storage battery with which automobiles are equipped is indicated at 44 and is connected at one side by conductor 54 to ground 45, while the other side carries a conductor 46 leading toward the switch. A branch 48 connects conductor 46 directly to conductor 55 leading to the horn 56 so that the latter can be sounded by operating the button 59 regardless of the position of the switch.

In the inactive position as shown in Fig. 5 current is supplied from battery 44 through conductor 46, conductors 48 and 49, to contact 1, through conductors 50 and 51 of switch member 42 to contact 3, through conductor 52 to ignition coil 43 and by conductor 53 to ground and back to battery 44 by conductor 54. Current will also flow through conductors 46, 48 and 55 to horn 56 and from thence through conductors 57, 58 and switch 59, when the latter is closed to sound horn, and then through conductor 60 to ground and back to battery 44 through conductor 54.

These circuits constitute normal conditions in which there are no closed circuits controlling the vehicle stopping mechanism 14.

In the active position shown in Fig. 6 current is also available for an emergency circuit that may be completed by the engagement of the front bumper 10 with the contact member 12. The switch 61 can be left open when the vehicle is moving forward so that in active position of Fig. 6 the rear bumper would then be disconnected electrically from an emergency circuit. This circuit is as follows: battery 44, conductor 46, conductor 47, contact 1', conductors 62 and 63 of switch member 42, contact 2, conductor 64, conductor 65, spring arm 40, bridge contact 41, spring arm 39, conductor 66, solenoid 34, conductor 67, conductor 68, contact member 12, bumper 10, conductor 69, and through ground and conductor 54 back to battery 44. It will be seen that the completion of the circuit described will energize the solenoid 34 which will swing the latch member 28 on its pivot 29, unlatch the links 22 and 24, raise the pivot 23 and break the joint at this point in the links followed by the shortening of the brake rod and an automatic emergency application of the brakes. At the same time the bridge contact 41 will be withdrawn from its bridging position between the spring arm 39 and 40 to thereby break the ignition circuit. In the active position of Fig. 6 the ignition circuit is as follows: battery 44, conductor 46, conductor 47, contact 1', conductors 62 and 63 of switch member 42, contact 2, conductor 64, conductor 65, spring arm 40, bridge contact 41, spring arm 39, conductor 70, contact 4, conductors 50 and 51 of switch member 42, contact 3', conductors 71 and 52, ignition coil 43, and conductor 53 to ground and back to battery 44 through conductor 54.

In the emergency position of Fig. 7 a definite emergency circuit is established independent of any contact caused by the movement of the bumper. The advantage of this position is that it gives the driver an opportunity to manually trip the brake actuating mechanism 14 should he observe that undesirable contact with the front bumper 10 was inevitable and therefore an immediate application of the brakes was necessary before such time as the bumper contacts would become effective. The circuit established under these conditions is as follows: battery 44, conductors 46, 47, 72, contact 1ᵃ, conductors 62 and 63 of switch member 42, contact 2', conductors 73, 65, spring arm 40, bridge contact 41, spring arm 39, conductor 66, solenoid 34, conductors 67, 68, 74, 75, contact 5, conductors 51 and 50 of switch member 42, contact 6, and conductor 76 and ground to conductor 54 and back to battery 44. The ignition circuit in this instance is the same as that of Fig. 6 and is broken when the switch member 42 is moved and its conductors 62 and 63 unbridge the contacts 1' and 2, so that the engine is stopped prior to the actuation of the brake applying mechanism.

In the parking position of the switch member 42 as shown in Fig. 8, a horn circuit is established which will produce an actuation of the horn 56 when the bumper 11 engages the contact member 13. This circuit is a follows: battery 44, conductors 46, 48, 55, horn 56, conductors 57, 77, contact 7, conductors 50 and 51 of switch member 42, contact 5', conductors 78, 74, 68, switch 61 (then closed) contact member 13, bumper 11, and conductor 79 and ground to conductor 54 and back to battery 44. The horn circuit is also established when an object hits the front bumper 10, in which case conductor 68 is grounded through contact 12 and conductor 69.

The manual switch 61 is closed whenever the machine is parked to thereby place the rear bumper in the protective circuit so that the horn will be sounded if the rear bumper is struck. Switch 61 is also closed when the machine is moving toward the rear to cause automatic stopping of the machine the instant the rear bumper contacts with an object.

I claim:

1. In an emergency control apparatus for motor vehicles equipped with a brake normally actuated by driver operable means, electrically controlled means for actuating the brake independently of the driver operable means, a circuit controller operable by the driver for bringing about an actuation of the electrically controlled means, and circuit controlling means controlled by the vehicle bumper for causing the electrically controlled means to act, said first circuit controller being also operable to prevent actuation of the electrically controlled means by operation of the second circuit controlling means.

2. In an emergency control apparatus for motor vehicles equipped with a brake normally actuated by driver operable means, electrically controlled means for actuating the brake independently of the driver operable means, a cut-out switch for the ignition circuit of the motor, said switch being operated by the electrically controlled means, a circuit controller operable by the driver for bringing about an actuation of the electrically controlled means, and circuit controlling means controlled by the vehicle bumper for causing the electrically controlled means to act, said first circuit controller being also operable to prevent actuation of the electrically controlled means by operation of the second circuit controlling means.

3. In an emergency control apparatus for motor vehicles equipped with a brake having a rod connection with an operating lever, means mounted in and normally forming part of said rod for actuating the brake independently of the operation of the lever, electrical controlling means for said brake actuating means, manual means operable independently of said operating lever for opening and closing a circuit through the electrically controlled means.

4. In an emergency control apparatus for motor vehicles equipped with a brake having a rod connection with an operating lever, spring means mounted in and normally forming part of said rod for actuating the brakes independently of the operation of the lever, means for normally latching the spring means against actuation, electrically controlled means for releasing the latching means, manual means operable independently of said operating lever for opening and closing a circuit through the electrically controlled means.

5. In an emergency control apparatus for motor vehicles equipped with a brake having a rod connection with an operating lever, means connected to said rod for actuating the brake independently of the operation of the lever, electrical controlling means for said brake actuating means, circuit controlling means controlled by the vehicle bumper for bringing about an actuation of the electrically controlled means and manually operable means arranged to effect opening and closing of a circuit through said electrical controlling means independently of said circuit controlling means.

6. In an emergency control apparatus for motor vehicles equipped with a brake having a rod connection with an operating lever, means connected to said rod for actuating the brake independently of the operation of the lever, electrical controlling means for said brake actuating means, and a circuit controller operated by the driver for bringing about an actuation of the electrical controlling means.

7. In an emergency control apparatus for motor vehicles equipped with a brake having a rod connection with an operating lever, means connected to said rod for actuating the brake independently of the operation of the lever, electrical controlling means for said brake actuating means, a circuit controller operable by the driver for bringing about an actuation of the electrical controlling means, and circuit controlling means controlled by the vehicle bumper for causing the electrical controlling means to act.

8. In an emergency control apparatus for motor vehicles equipped with a brake having a rod connection with an operating lever, means connected to said rod for actuating the brake independently of said lever, electrical controlling means for said brake actuating means, means operable by said brake actuating means for disrupting the engine ignition circuit when the brake is actuated, circuit controlling means controlled by the vehicle bumper for causing the electrical controlling means to act and a manually operable switch controlling both said electrical controlling means and said circuit controlling means whereby said electrical controlling means may be operated independently of and in connection with the circuit controlling means selectively.

9. In an emergency control apparatus for motor vehicles equipped with a bumper and a brake normally actuated by driver operable means, electrically controlled means for actuating the said brake independently of the driver operable means, a bumper controlled circuit for actuating said electrically controlled means, and a manual control movable to different positions to actuate said circuit, to render said circuit inactive, or to place said circuit in protective condition.

10. In an emergency control apparatus for motor vehicles equipped with a bumper and a brake normally actuated by driver operable means, electrically controlled means for actuating the said brake independently of the driver operable means, a circuit for actuating said electrically controlled means, said circuit including a bumper contact, and a manual control movable to one position to activate said circuit and operate said electrically controlled means, to another position to render said circuit inactive, and to a third position placing said circuit under the influence of the bumper contact.

11. In an emergency control apparatus for motor vehicles equipped with a bumper and a brake normally actuated by driver operable means, electrically controlled means for actuating the said brake independently of the driver operable means, an alarm device, a bumper-controlled contact, and a manual control switch movable to one position to form a circuit placing the electrically controlled means under the influence of the bumper-controlled contact, to another position to form a circuit placing the alarm device under the influence of the bumper-controlled contact, and to a third position rendering the bumper-controlled contact inactive.

12. In an emergency control apparatus for motor vehicles equipped with a brake normally actuated by driver operable means including a brake rod, means for actuating the brake independently of the driver operable means consisting of links pivoted together and interposed in the brake rod and having their opposite ends pivoted to the respective ends of the interrupted brake rod and normally in alinement with said brake rod, opposed compression springs held under compression by said links, and a latch member adapted to maintain said alinement and to operate to break said alinement, release said springs and thereby shorten the brake rod and apply said brakes.

13. In an emergency control apparatus for motor vehicles equipped with a brake normally actuated by driver operable means including a brake rod, means for actuating the brake independently of the driver operable means consisting of spring-pressed rod sections interposed in the brake rod, links pivoted to each other and to the rod sections and adapted to hold the rod sections apart when in alinement therewith, a latch member normally holding the links in said alinement, means to operate said latch to force the links out of alinement and allow the springs to shorten the brake rod and apply the brakes, and a switch connected to the spring-pressed means and controlling the ignition circuit so that upon operation of said latch the ignition circuit will be broken.

14. In an emergency control apparatus for motor vehicles equipped with a brake normally actuated by driver operable means including a brake rod, means for actuating the brake independently of the driver operable means consisting of spring-pressed rod sections interposed in the brake rod, links pivoted to each other and to the rod sections and adapted to hold the rod sections apart when in alinement therewith, a latch member normally holding the links in said alinement, means to operate said latch to force the links out of alinement and allow the springs to shorten the brake rod and apply the brakes, a pair of spaced contacts placed in the ignition circuit of the motor, and a bridge contact carried by one of the rod sections so that upon movement of said rod section the ignition circuit will be broken.

15. In an emergency control for motor vehicles, a brake rod comprising two rod sections, a housing inclosing said rod sections, springs mounted upon the rod sections within the housing and normally pressing the ends of the rod sections toward each other, a link pivoted to each rod section, the links being pivoted to each other, a pintle carried by one of the links, a latch normally engaging the pintle to hold the links in alinement with the rods, a cam surface formed on the latch to force the pintle upwards to break the alinement of the links, and means to operate the latch.

16. In an emergency control for motor vehicles, a brake rod comprising two rod sections, a housing inclosing said rod sections, springs mounted upon the rod sections within the housing and normally pressing the ends of the rod sections toward each other, a link pivoted to each rod section, the links being pivoted to each other, a pintle carried by one of the links, a latch normally engaging the pintle to hold the links in alinement with the rods, a cam surface formed on the latch to force the pintle upwards to break the alinement of the links, a solenoid mounted in said housing to operate the latch, and a circuit for controlling the solenoid.

17. In an emergency control for motor vehicles, a brake rod comprising two rod sections, a housing inclosing said rod sections, springs mounted upon the rod sections within the housing and normally pressing the ends of the rod sections toward each other, a link pivoted to each rod section, the links being pivoted to each other, a pintle carried by one of the links, a latch normally engaging the pintle to hold the links in alinement with the rods, a cam surface formed on the latch to force the pintle upwards to break the alinement of the links, a switch for controlling the ignition circuit of the motor and having a part carried by one of said rod sections, a solenoid mounted in said housing to operate the latch, and a circuit for controlling the solenoid.

18. An automobile including brakes and a brake-rod in two portions connected by an apparatus comprising means for automatically contracting the overall length of said brake-rod, means normally locking said contracting means and means controlled from a remote point for releasing said locking means, the said locking means being adapted to return to locking position when said brake-rod is extended to normal length, and means for returning said locking means to locking position by the movement of the operator which normally applies the brakes.

19. An automobile including brakes and a brake rod in two portions connected by an apparatus comprising means for automatically contracting the overall length of said brake-rod, means normally locking said brake-rod in extended position, electro-magnetic means controlling said locking means, an associated electrical circuit and means accessible to an occupant of the automobile for completing said electrical circuit, whereby said brakes may be instantaneously applied from any selected position within said vehicle.

20. An automobile including an engine, an ignition circuit for said engine, a clutch thru which the engine drive is communicated to the wheels, and brakes, which automobile comprises means for automatically applying the brakes and simultaneously disrupting said ignition circuit while leaving the clutch engaged, said means comprising a brake-rod having a contractible overall length and also comprising mechanism carried by said brake rod for disrupting said ignition circuit upon the contracting of the overall length of said brake-rod, means normally locking said means for applying the brakes, means controlled from a remote point for releasing said locking means, whereby said vehicle may be stopped in an emergency by the simultaneous effects of the application of the brakes and the drag of the engine.

21. An automobile including an engine, an ignition circuit for said engine, a clutch thru which the engine drive is communicated to the wheels, and brakes, which automobile comprises means for automatically applying the brakes and simultaneously disrupting said ignition circuit while leaving the clutch engaged, means normally locking said means for applying the brakes, electro-magnetic means for releasing said locking means, an associated electrical circuit and means accessible to an occupant of the automobile for completing said electrical circuit, whereby the automobile may be stopped from any selected position within the same by the combined effects of the application of the brakes and the drag of the engine.

22. An automobile including an engine, an ignition circuit for said engine, brakes and brake-rods controlling the same which automobile comprises a brake-rod in at least two portions connected by an apparatus comprising a housing, means within said housing exerting a force tending to diminish the overall length of said rod, means locking said rod in extended position, contact members within said housing in series with said ignition circuit actuated by the relative movement of said rod portions adapted to meet when said rod is in extended position and to part when said rod is in contracted position, electromagnetic means controlling said locking means and an associated electrical circuit.

23. An automobile including an engine, an ignition circuit for said engine, brakes and brake-rods controlling the same, one of said brake-rods being in two portions connected by an apparatus comprising a housing, means within said housing exerting a force tending to diminish the overall length of said brake-rod, means locking said rod in extended position, contact members within said housing in series with said ignition circuit actuated by the relative movement of said rod portions adapted to meet when said brake-rod is in extended position and to part when said rod is in contracted position, electromagnetic means controlling said locking means, an associated electrical circuit and means accessible to an occupant of the automobile for completing said electrical circuit.

24. An automobile including a bumper, brakes and brake-rods controlling the same, one of said brake-rods being in two portions connected by an apparatus comprising a housing, toggle links within said housing so connected as to move in response to variations in the overall length of said brake-rod, springs exerting a force tending to diminish the overall length of said rod, means locking said rod at a predetermined overall length, and means operated by bumper movement for releasing said locking means to automatically apply said brake.

25. An automobile including a bumper, brakes and brake rods controlling the same, one of said brake-rods being in two portions connected by an apparatus comprising a housing, toggle links within said housing so connected as to move in response to variations in the overall length of said brake-rod, springs exerting a force tending to diminish the overall length of said rod, means locking said rod at a predetermined overall length, electromagnetic means controlling said locking means and a circuit including said electromagnetic means and contacts operated by bumper movement.

26. An automobile including a bumper, brakes and brake-rods controlling the same, one of said brake rods being in two portions connected by an apparatus comprising a housing, toggle links within said housing so connected as to move in response to variations in the overall length of said brake-rod, springs exerting a force tending to diminish the overall length of said rod, means locking said rod at a predetermined overall length, electromagnetic means controlling said locking means, a circuit including said electromagnetic means and contacts operated by bumper movement and means accessible to an occupant of the automobile for completing said circuit and effecting brake application by action of said apparatus.

In testimony whereof I affix my signature.

KARL OSTEN SCHAUMAN.